(12) United States Patent
Trichina et al.

(10) Patent No.: US 8,130,955 B2
(45) Date of Patent: Mar. 6, 2012

(54) RANDOM NUMBER GENERATION THROUGH USE OF MEMORY CELL ACTIVITY

(75) Inventors: Elena Trichina, Munich (DE); Helena Handschuh, Paris (FR)

(73) Assignee: Spansion LLC, Sunnyvale, CA (US)

( * ) Notice: Subject to any disclaimer, the term of this patent is extended or adjusted under 35 U.S.C. 154(b) by 845 days.

(21) Appl. No.: 11/962,955

(22) Filed: Dec. 21, 2007

(65) Prior Publication Data
US 2009/0165086 A1 Jun. 25, 2009

(51) Int. Cl.
*H04L 9/00* (2006.01)

(52) U.S. Cl. ......... 380/268; 380/28; 380/46; 380/267; 380/44; 365/185.01; 365/185.26; 708/250; 708/255; 331/78

(58) Field of Classification Search .......... 708/255, 708/44, 250; 380/46, 267, 268; 331/78
See application file for complete search history.

(56) References Cited

U.S. PATENT DOCUMENTS

| 5,379,355 | A * | 1/1995 | Allen ........................... 382/238 |
|---|---|---|---|
| 6,687,721 | B1 | 2/2004 | Wells et al. |
| 6,792,438 | B1 | 9/2004 | Wells et al. |
| 6,798,883 | B1 * | 9/2004 | Buller .............................. 380/2 |
| 6,985,918 | B2 * | 1/2006 | Shackleford et al. ......... 708/250 |
| 7,076,108 | B2 * | 7/2006 | Huang et al. .................. 382/240 |
| 7,496,617 | B2 * | 2/2009 | Franke et al. ................. 708/255 |
| 7,502,815 | B1 * | 3/2009 | Drimer .......................... 708/255 |
| 7,566,010 | B2 * | 7/2009 | Yamazaki et al. ............. 235/492 |
| 7,761,910 | B2 * | 7/2010 | Ransom et al. ................... 726/6 |
| 7,809,361 | B2 * | 10/2010 | Ekberg et al. ............. 455/414.1 |
| 7,885,990 | B2 * | 2/2011 | Dover ........................... 708/255 |
| 2002/0112183 | A1 * | 8/2002 | Baird et al. ................... 713/201 |
| 2004/0024755 | A1 * | 2/2004 | Rickard .............................. 707/3 |
| 2004/0039762 | A1 * | 2/2004 | Hars ............................. 708/255 |
| 2004/0248549 | A1 * | 12/2004 | Drews .......................... 455/410 |
| 2004/0267847 | A1 * | 12/2004 | Harper ......................... 708/250 |
| 2005/0146006 | A1 * | 7/2005 | Yamazaki et al. ............. 257/679 |
| 2006/0235917 | A1 * | 10/2006 | Manber ........................ 708/250 |
| 2007/0098150 | A1 * | 5/2007 | Lauter et al. .................... 380/28 |
| 2007/0180285 | A1 * | 8/2007 | Dembo ......................... 713/500 |
| 2007/0276890 | A1 * | 11/2007 | Franke et al. ................. 708/255 |
| 2007/0293197 | A1 * | 12/2007 | Ekberg et al. ............. 455/414.1 |
| 2008/0010331 | A1 * | 1/2008 | Janke et al. ................... 708/250 |
| 2008/0046216 | A1 * | 2/2008 | Thomas ........................ 702/179 |
| 2008/0170694 | A1 * | 7/2008 | Ryan et al. ................... 380/277 |
| 2008/0256151 | A1 * | 10/2008 | Acar et al. .................... 708/250 |
| 2008/0301210 | A1 * | 12/2008 | Dover .......................... 708/250 |
| 2008/0309401 | A1 * | 12/2008 | Sato ............................. 327/581 |

* cited by examiner

*Primary Examiner* — April Shan
(74) *Attorney, Agent, or Firm* — Turocy & Watson, LLP

(57) ABSTRACT

Systems and/or methods that facilitate security of data are presented. A random number generation component generates random numbers based in part on electron activity in a select memory cell(s) to facilitate data security. Sensor components that are highly sensitive can be employed to sense activity of the select memory cell(s) and/or reference memory cell in a noise margin associated with respective memory cells in the memory component. The activity of the select memory cell is compared to the reference memory cell(s) to facilitate generating binary data. The binary data is provided to the random number generation component where the binary data is evaluated to determine whether a predetermined level of entropy exists in the binary data. The binary data, or a portion thereof, can be processed to generate random numbers that are utilized in cryptographic processes and/or as a physical signature to facilitate data security.

17 Claims, 12 Drawing Sheets

RANDOM NUMBER GENERATION THROUGH USE OF MEMORY CELL ACTIVITY

BACKGROUND

Electronic communication of information has become commonplace. Today, information, including sensitive information, regarding individuals, businesses, and other entities, can be communicated electronically between devices. For example, computers, cellular phones, smart cards, and other electronic devices can be utilized to electronically communicate information between users. Further, devices, like smart cards, can be utilized to provide a digital signature or other authentication information that can reasonably identify the user of the smart card and can provide certain information regarding the user and/or can enable the user to sign electronic documents (e.g., legal documents) in a secure manner.

With regard to the electronic communication of sensitive information, encryption/decryption techniques can be utilized to protect such information from being accessed by undesired persons (e.g., attackers, hackers). For example, public key encryption can be utilized to secure information electronically communicated between devices. For example, when sending a message, an entity can utilize a public key, which can be published and made available to users, to encrypt the message data. The encrypted message can be sent to a recipient, who can utilize a private key, which can be known to the recipient but not others, so that the encrypted message data can be decrypted and the message can be perceived in a usable form. To facilitate data security, random numbers can be generated and/or employed to work in conjunction with cryptographic algorithms to facilitate randomization of the cryptographic process. Further, random numbers can be utilized to facilitate identifying a device and/or a user of the device.

One type of random number generator is a pseudo random number generator, which can generate random-looking numbers based on an algorithm, for example. Data secured using numbers generated by a pseudo random number generator can be susceptible to attack as an attacker can potentially learn the algorithm used to generate the random-looking numbers, for example, by observing a pattern of number generation associated with the algorithm, and can thereby discover the data secured using such random-looking numbers.

True random number generators can generate random numbers, for example, based on a physical phenomena, such as thermal noise. True random number generators can be preferred over pseudo random number generators because a true random number generator can generate a truly random number, as opposed to pseudo random number generators that generate numbers that appear to be random. However, with portable electronic devices, generating random numbers based on, for example, thermal noise can be problematic and/or can subject data to attack, as an attacker can attempt to influence the generation of random numbers by controlling the thermal conditions associated with the electronic device.

It is desirable to maintain the security of information communicated electronically from attack. It is also desirable to be able to provide a unique identification associated with an electronic device and/or user, where the unique identification can be related to a random number. Further, it is desirable that such random number generation be manageable on electronic devices, including portable electronic devices (e.g., cellular phones, smart cards), such that there is a low risk of attack.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

The disclosed subject matter relates to systems and/or methods that can facilitate securing information, such as information communicated electronically. In accordance with an aspect of the disclosed subject matter, a random number generation component can be employed to facilitate generating random numbers that can be utilized to facilitate securing data, and/or identifying an electronic device, associated memory component, and/or user associated with the electronic device. In one aspect, the random number generation component can generate random numbers based in part on activity associated with a select memory cell(s) in a memory component. The random number generation component can be associated with a sensor component that can sense activity, such as electron activity, within the select memory cell(s) in a memory array in the memory component (e.g. flash memory). The sensed activity can be converted to a corresponding voltage level, which can be compared to a reference voltage level associated with a reference cell(s) in the memory array to facilitate determining a data value (e.g., binary data value) for each portion of the sensed activity, and the data associated with the sensed activity (e.g., sequence(s) of binary data) can be provided to the random number generation component.

In one aspect, the random number generation component can evaluate (e.g., pre-test) the data to determine whether a predetermined amount of entropy (e.g., information entropy) exists in the data, or a portion thereof, such that the data (or portion of the data) can have sufficient randomness so that it can be utilized to generate random numbers. For example, data that is all or virtually all 0s, data that is all or virtually all 1s, and/or data that consistently alternates between 0s and 1s, can be determined to be undesirable number sequences and can be disregarded. If the data, or portion of data, meets the predetermined amount of entropy, such data can be processed (e.g., compressed) to produce a random number(s), or random sequence(s), that can be utilized to secure data, such as by facilitating data encryption or decryption, and/or authentication and/or identification of an electronic device associated with the random number generation component.

In accordance with still another aspect, methods that can generate random numbers to facilitate securing data associated with a memory component and/or identification of a device and/or associated user are presented. In another aspect, electronic devices are presented that can comprise a memory component(s) and a random number generation component structured in accordance with the disclosed subject matter.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed

DETAILED DESCRIPTION

Figure 1:
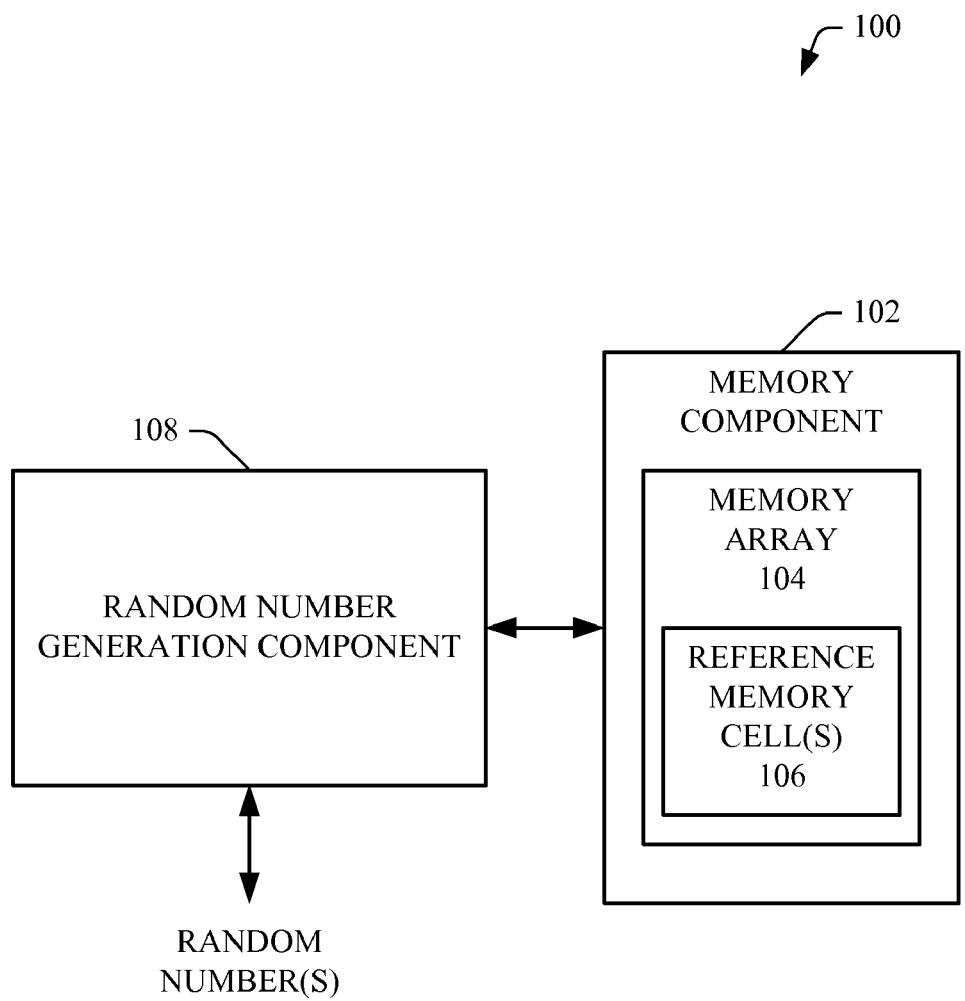
FIG. 1 illustrates a block diagram of a system that facilitates security of data in accordance with an aspect of the subject matter disclosed herein.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

Electronic communication of information has become commonplace. Data security to protect information (e.g., sensitive information) is paramount. Cryptographic protocols and authentication protocols can often employ random numbers to facilitate securing data. Random number generators can be employed to generate the random numbers. True random number generators can be preferred over pseudo random number generators, which do not truly generate random numbers. Conventionally, a true random number generator can utilize a physical phenomena, such as thermal noise, to generate random noise and/or numbers. However, with portable electronic devices (e.g., cellular phone), utilizing thermal noise to generate random numbers can be problematic, as attackers can influence the generation of random numbers by controlling the thermal conditions of the electronic device, and can thereby discover and/or corrupt the data. It is desirable to generate random numbers to facilitate securing information from attack. Further, it is desirable that such random number generation be manageable on electronic devices, including portable electronic devices (e.g., cellular phones, smart cards), such that there is a low risk of attack.

Systems and/or methods are presented that facilitate securing data by employing random number generation. A random number generation component can receive information regarding sensed activity of a select memory cell(s) in the memory component (e.g., flash memory), where a reference memory cell(s) in the memory component can be utilized as a reference, to facilitate generating binary data based in part on the sensed activity. The binary data can be provided to the random number generation component, and the random number generation component can evaluate the binary data to determine whether the data, or a portion thereof, contains a desired level of entropy, so that such data can be utilized to harvest random numbers. If so, the random number generation component can process the data to harvest a random number(s) (e.g., random number sequence). The random number(s) can be provided, so that such random number(s) can be employed in cryptographic processes and/or as a physical signature associated with a device to facilitate authentication of the device.

Figure 5:
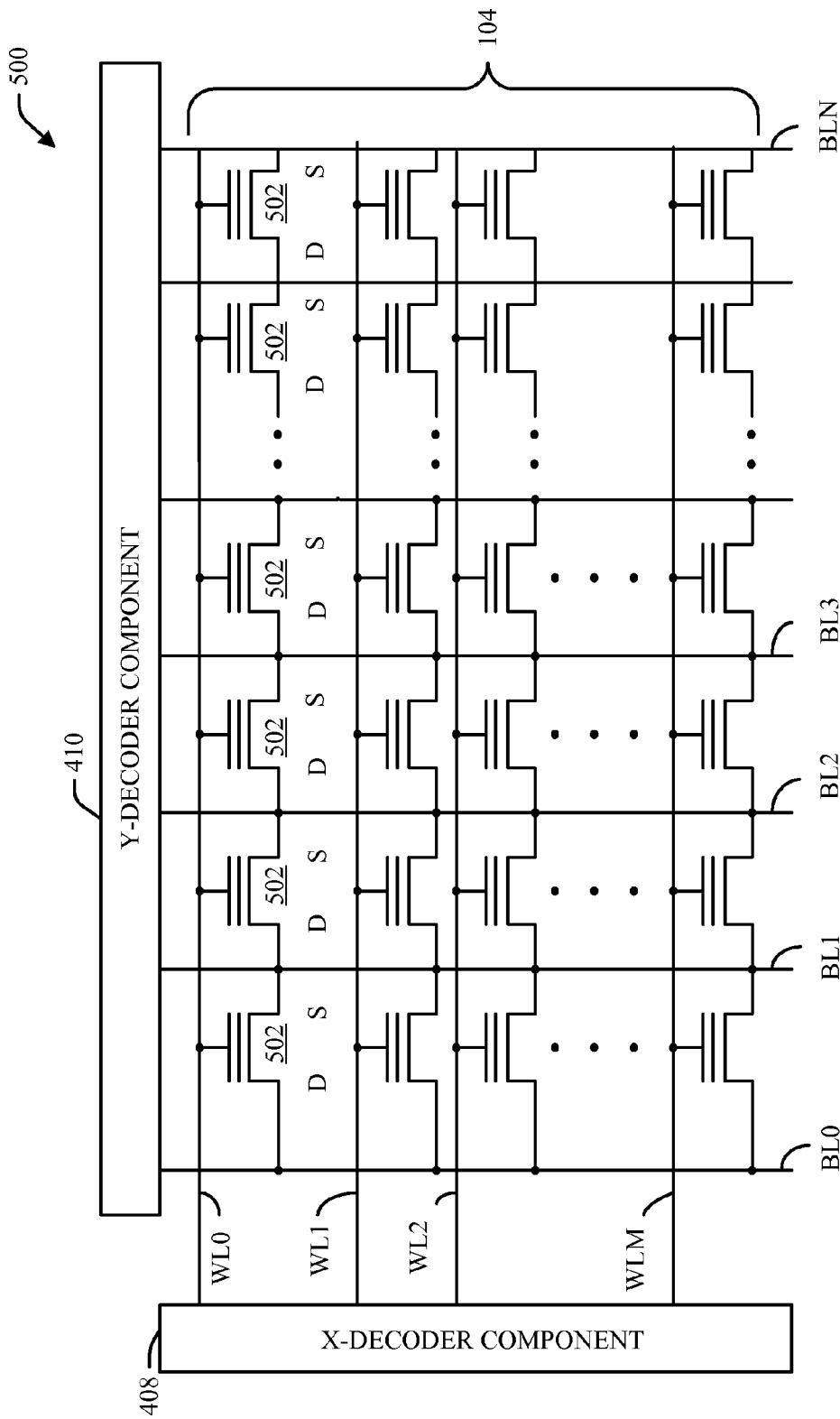
FIG. 5 depicts a block diagram of a system that can facilitate access and/or storage of data in accordance with an aspect of the disclosed subject matter

Turning to FIG. 1, illustrated is a system 100 that facilitates security of data in accordance with an aspect of the disclosed subject matter. System 100 can include a memory component 102 that can comprise a non-volatile memory (e.g., flash memory) and/or volatile memory (e.g., random access memory (RAM)). The memory component 102 can receive information, including data, commands, and/or other information, which the memory component 102 can process (e.g., store data, execute commands, etc.). The memory component 102 can include a memory array 104 that can receive and store data. The memory array 104 can include a plurality of memory cells (e.g. as depicted in FIG. 5), including one or more reference cells 106, wherein each memory cell can store one or more bits of data. Data stored in a memory cell(s) in the memory array 104 can be read and such data can be provided as an output, or can be erased from the memory cell(s).

Each memory cell in a memory array 104 can have a respective amount of activity, such as electron activity. For example, where the memory component 102 is a flash memory, a flash memory cell, which can have a source, drain, and a gate associated with the transistor of the memory cell, can have an electric field due to respective voltages applied to the source, drain, and gate. Under certain conditions, depending in part on the respective voltages applied to the cell, electrons can flow and can become trapped in the gate (e.g. floating gate), or can be removed from the gate. Thus, with the flow of electrons within the memory cell, there can be an unknown random number of electrons actively moving within the cell at any given time.

Figure 2:
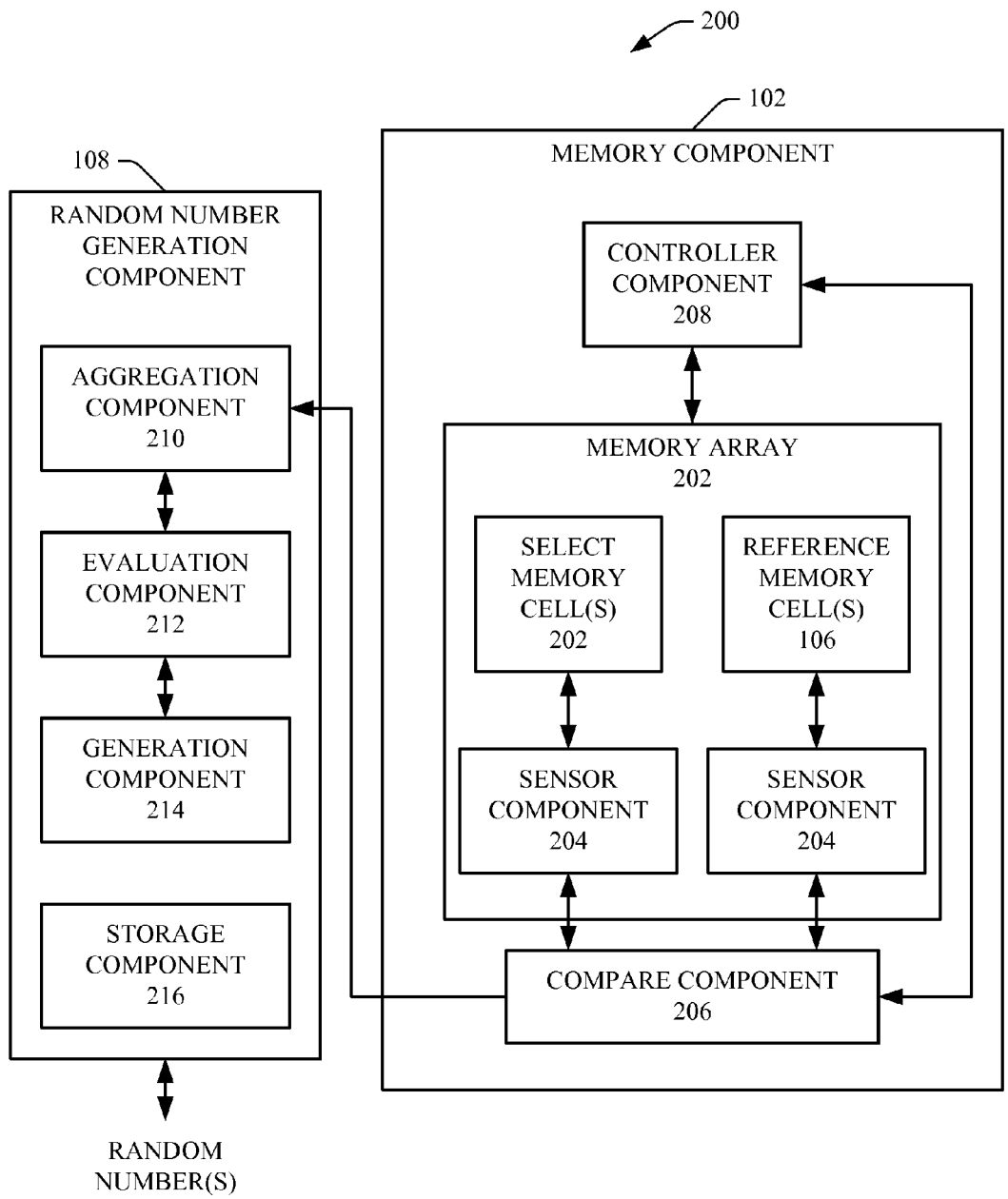
FIG. 2 illustrates a block diagram of a system that can generate random numbers to facilitate security of data in accordance with an aspect of the subject matter disclosed herein.

In one aspect, the reference memory cell(s) 106 can be utilized to facilitate random number generation as activity, such as electron activity, associated with a certain memory cell(s) (e.g., select memory cells, as illustrated in FIG. 2 and described herein) in the memory array 104 can be sensed, and the sensed activity can be evaluated (e.g., compared) with a noise margin associated with the reference memory cell(s) 106 to facilitate determining a binary value associated with the sensed activity based in part on a predetermined threshold level(s) related to the noise margin. In one aspect, the reference memory cell(s) 106 can be programmed to a predetermined voltage level that can represent and/or be associated with the noise margin associated with the memory cells of memory array 104. If the sensed activity of the specified memory cell is within the noise margin, a first binary value (e.g. 1) can be assigned for such sensed activity; and if sensed activity of a specified memory cell is outside of the noise margin, a second binary value (e.g., 0) can be assigned to that sensed activity.

In accordance with one aspect, the memory component 102, and/or reference memory cell(s) 106, can be associated with a random number generation component 108 that can generate random numbers based in part on activity associated with certain specified memory cell(s) in the memory array 104. The random number generation component 108 can receive information (e.g., binary data values) associated with the sensed activity associated with the specified memory cell(s) and can collect such information. The random number generation component 108 can evaluate such information to determine whether such information contains the desired entropy so that the information can be utilized for random number generation. In one aspect, the information can be pre-tested (e.g., in accordance with AIS 31) to determine whether the desired entropy is present. If the desired entropy is present, the information can be utilized to facilitate random number generation; if the desired entropy is not present, a new set of information associated with memory cell activity can be obtained and evaluated to determine whether the desired entropy is present.

Once the desired entropy is present with regard to information (e.g., sequence of binary data) associated with sensed activity of a memory cell(s), the information, which can also be referred to as raw data or raw numbers, can be the seed that can be utilized to generate random numbers. In one aspect, the random number generation component 108 can process the information to generate random numbers. For instance, the random number generation component 108 can process the raw data by compressing the raw data to harvest a reasonable amount of entropy from the raw data to facilitate generating random numbers.

The random numbers, and/or the raw data (e.g. having entropy), can be utilized for a number of different purposes, such as, for example, to facilitate performing cryptographic functions, and/or to facilitate generation of a physical signature (e.g., physically uncloneable function (PUF)) based in part on the raw data. For example, a cryptographic process can be utilized to encrypt and decrypt data to facilitate data security, and the random numbers can be utilized to randomize exponentiation of data during decryption of the data to facilitate securing data from attacks, such as side-channel attacks. As another example, the raw data, or processed data based in part on the raw data, can be utilized as a unique physical signature (e.g. PUF) of a device associated therewith, which can be stored in a secure area of the memory component 102, and the physical signature can be provided to facilitate identification and/or authentication of the memory component 102 and/or the device associated therewith. As further example, random numbers can be employed to facilitate implementing challenge-response protocols, generating digital signatures on electronic documents, and/or implementing complex cryptographic protocols and/or computations (e.g., cryptographic algorithms that utilize random numbers).

In accordance with one embodiment, read operations, write operations, and/or erase operations associated with a specified memory cell(s) in the memory array 104 can be augmented to sense activity, such as electron activity, in the specified memory cell(s), in addition to performing the desired operation on the specified memory cell(s). In accordance with another embodiment, the activity of a specified memory cell(s) can be obtained via a separate operation to sense the activity of such specified memory cell(s).

Referring back to the memory component 102, the memory component 102 can comprise nonvolatile memory and/or volatile memory, where such nonvolatile memory can include, but is not limited to, read-only memory (ROM), flash memory (e.g., single-bit flash memory, multi-bit flash memory), mask-programmed ROM, programmable ROM (PROM), Erasable PROM (EPROM), Ultra Violet (UV)-erase EPROM, one-time programmable ROM, electrically erasable PROM (EEPROM), and/or nonvolatile RAM (e.g., ferroelectric RAM (FeRAM)); and such volatile memory can include, but is not limited to, RAM, static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). In one aspect, a flash memory can be comprised of NAND memory and/or NOR memory, for example.

The subject innovation can facilitate improved generation of true random numbers in a secure manner that can facilitate protecting the generation of random numbers and/or operations that utilize the random numbers from attacks, as compared to conventional random number generators. The subject innovation can utilize activity associated with memory cells in a memory array 104, which can facilitate providing true randomness to facilitate true random number generation. Conventional random number generators can utilize thermal noise or ring oscillators to generate random numbers. However, such conventional random number generators and/or data associated therewith can be subject to attack, as, for example, with regard to a random number generator utilizing thermal noise, an attacker can control and/or influence the thermal conditions of the device providing the thermal noise and can thereby control and/or influence the numbers generated, which the attacker can utilize to discover and/or corrupt data. The subject innovation can facilitate true random number generation by utilizing activity (e.g., electron activity) of a memory cell(s), and can thereby reduce and/or minimize the risk of influencing random number generation and risk of attack on the data.

Referring to FIG. 2, depicted is a block diagram of a system 200 that can generate random numbers to facilitate data security in accordance with an aspect of the disclosed subject matter. System 200 can include a memory component 102 that can receive and store data, can provide data as an output. The memory component 102 can include a memory array 104 that can comprise a plurality of memory cells, including one or more reference memory cells 106, in which data can be stored. The memory component 102 can comprise a nonvolatile memory (e.g., flash memory) and/or volatile memory (e.g., random access memory (RAM)). The memory component 102 can be associated with a random number generation component 108 that can generate random numbers based in part on activity associated with memory cells in the memory array 104, where the random numbers can be utilized to facilitate data security. The memory component 102, memory array 104, reference memory cell(s) 106, and random number generation component 108, each can be the same or similar, and/or can contain the same or similar functionality, as respective components as described herein, for example, with regard to system 100.

The memory array can include a select memory cell(s) 202 as well as a reference memory cell(s) 106 that can be utilized to facilitate generation of random numbers. In one aspect, the select memory cell(s) 202 and the reference memory cell(s) 106 each can be associated with respective sensor components 204, where each sensor component 204 can sense activity, such as electron activity, that can occur in the memory cell (e.g. select memory cell 202, reference memory cell 106) respectively associated therewith.

In accordance with an aspect of the disclosed subject matter, the sensor component 204 can be a highly sensitive converter that can sense electron activity in the associated memory cell, where the sensor component 204 can be structured so that it can operate within a noise margin associated with the memory cells, such as the select memory cell(s) 202 and the reference memory cell(s) 106, in the memory array 104. Respective read, write, and erase algorithms can take into account the inherent noise associated with memory cells, as even digital components, such as memory cells, are not noise free. Each sensor component 204, associated with a select memory cell(s) 202 or reference memory cell 106, can be structured such that the sensor component 204 can sense current levels (e.g., which can be converted to a corresponding voltage level by the sensor component 204) associated with electron activity in the associated cell to a fine granularity, as compared to sensor components utilized to detect current levels for read, write, and/or erase operations, for example, with regard to other memory cells in memory array 104, where the enhanced sensitivity of the sensor component 204 can facilitate detecting sensed activity of the associated memory cell and determining whether the sensed activity falls within a predefined noise margin associated with such memory cell.

In another aspect, the noise margin, as represented by the reference memory cell(s) 106, can be demarcated with respective predetermined threshold voltage levels, wherein a detected voltage level falling within the respective predetermined threshold voltage levels can have a first binary value (e.g., 1) and a detected voltage level falling outside the respective predetermined voltage levels can have a different binary value (e.g., 0).

In accordance with another aspect, the sensed activity of the select memory cell(s) 202, as converted to respective voltage levels, where each voltage level can be provided to a compare component 206 and the reference voltage associated with the reference memory cell 106 can be provided to the compare component 206 as well. The compare component 206 can evaluate (e.g., compare) the voltage level associated with sensed activity and the reference voltage level to determine whether the voltage level associated with the sensed activity is within the noise margin or not. If the compare component 206 determines that the voltage level associated with the sensed activity is within the noise margin, such voltage level can have a first binary value, and if the compare component 206 determines that the voltage level associated with the sensed activity is not within the noise margin, such voltage level can have a different binary value. The determined binary value can be provided as an output from the compare component 206, for example, to the random number generation component 108.

In still another aspect, the select memory cell(s) 202 can be a subset of the plurality of memory cells in the memory array 104, where a certain number of the select memory cells 202 can be utilized to facilitate random number generation, while other select memory cells 202 can be set aside for future use, such as where the certain number of select memory cells 202 and/or the sensor components 204 associated therewith are rendered unusable. In yet another aspect, the subset of select memory cells 202 can be used on a rotating basis so that a particular select memory cell 202 is not overly worn as compared to other select memory cells 202.

In accordance with an aspect, the reference memory cell(s) 106 can be a subset of the plurality of memory cells in the memory array 104, where a certain number of the reference memory cells 106 can be utilized to facilitate random number generation, while other reference memory cells 106 can be set aside for future use, such as where the certain number of reference memory cells 106 and/or the sensor components 204 associated therewith are rendered unusable. In accordance with another aspect, the subset of reference memory cells 106 can be used on a rotating basis so that a particular reference memory cell 106 is not overly worn as compared to other reference memory cells 106.

In accordance with an aspect of the disclosed subject matter, the memory component 102 can comprise a controller component 208 that can facilitate control of the flow of data to and from the memory component 102. In an aspect, the controller component 208 can facilitate execution of operations (e.g., read, write, verify, erase) associated with memory locations (e.g., memory cells) in the memory array 104 based in part on received commands. In another aspect, the controller component 208 can facilitate verifying and/or maintaining the desired charge level(s) associated with data stored in the memory locations in the memory array 104. In still another aspect, the controller component 208 can facilitate controlling the sensing of activity by the sensor component 204, the evaluation of the sensed activity by the compare component 206, and/or other functions associated with the memory component 102.

In accordance with one aspect, the random number generation component 108 can receive the determined binary values respectively associated with sensed activity of the select memory cell(s) 202 in the memory array 104. The random number generation component 108 can facilitate generating random numbers based in part on activity associated the select memory cell(s) 202. In one aspect, the random number generation component 108 can comprise an aggregation component 210 that can aggregate, filter, select, and/or organize the received information from the compare component 206 and/or other information associated with the sensed activity of the select memory cell(s) 202 to facilitate the generation of random numbers by the random number generation component 108. For example, the aggregation component 210 can organize the received information, which can be in the form of binary data, in a desired order (e.g., in an order the binary data is received) and/or can organize the binary data into binary sequences of a predetermined number of bits of data.

In accordance with still another aspect, the random number generation component 108 can include an evaluation component 212 that can evaluate such received information to determine whether such information contains the desired entropy (e.g. information entropy) so that the information can be utilized for random number generation. In one aspect, the evaluation component 212 can facilitate pre-testing (e.g., in accordance with AIS 31) of the received information and/or can determine whether the desired entropy is present, so that the received information, or a portion thereof, can be utilized to facilitate generating random numbers. If the evaluation component 212 determines that the desired entropy is present, the information can be utilized to facilitate random number generation; if the desired entropy is not present, a new set of information associated with memory cell activity can be obtained and evaluated to determine whether the desired entropy is present.

For example, the evaluation component 212 can evaluate the received information (e.g., binary sequence) and can determine that the desired entropy is not present in the received information, or a portion of the received information, where all or a significant contiguous portion of the received information has the same data value, or has a consistently alternating data value, such that the data alternates between 0 and 1, for instance, as the evaluation component 212 can determine that such received information does not have the desired entropy.

Once the desired entropy is present with regard to information (e.g., sequence of binary data) associated with sensed activity of a memory cell(s), the information, which can also be referred to as raw data or raw numbers, can be the seed that can be utilized to generate random numbers. In one aspect, the random number generation component 108 can comprise a generation component 214 that can process the information to generate random numbers. For instance, the random number generation component 108 can process the raw data by compressing the raw data to harvest a reasonable amount of entropy from the raw data to facilitate generating random numbers. The generated random numbers can be provided as an output and/or can be stored in a storage component 216 in or associated with the random number generation component 108.

In accordance with another aspect, the storage component 216 can store respective items of information that can facilitate aggregating the received information (e.g., received from the compare component 208), evaluating the received information (e.g., pre-testing received information), and/or generating random numbers (e.g., processing of at least a portion of the received information having the desired entropy). For example, the storage component 216 can store pre-test information (e.g., algorithm(s) and/or other data associated with pre-testing to determine whether desired entropy exists with regard to the received information) that can be associated with pre-testing the received information associated with sensed activity of the select memory cell(s) 202. The evaluation component 212 can retrieve the pre-test information from the storage component 216 and can utilize the pre-test information to perform a pre-test of the received information to determine whether the received information, or a portion thereof, contains sufficient entropy for use in generating random numbers.

The random numbers, and/or the raw data (e.g. having desired entropy) based in part on the sensed activity, can be utilized for a variety of different purposes. For example, the random numbers can facilitate performing cryptographic functions, such as by utilizing random numbers to generate keys (e.g. private keys) to facilitate data encryption or decryption, to generate a digital signature, and/or to randomize exponentiation of data as part of data encryption/decryption or generation of a digital signature. As another example, the random numbers, and/or raw data, can be utilized to facilitate generation of a physical signature (e.g. PUF) that can be unique to the device associated therewith and can be used to facilitate authentication of the associated device.

Figure 3:
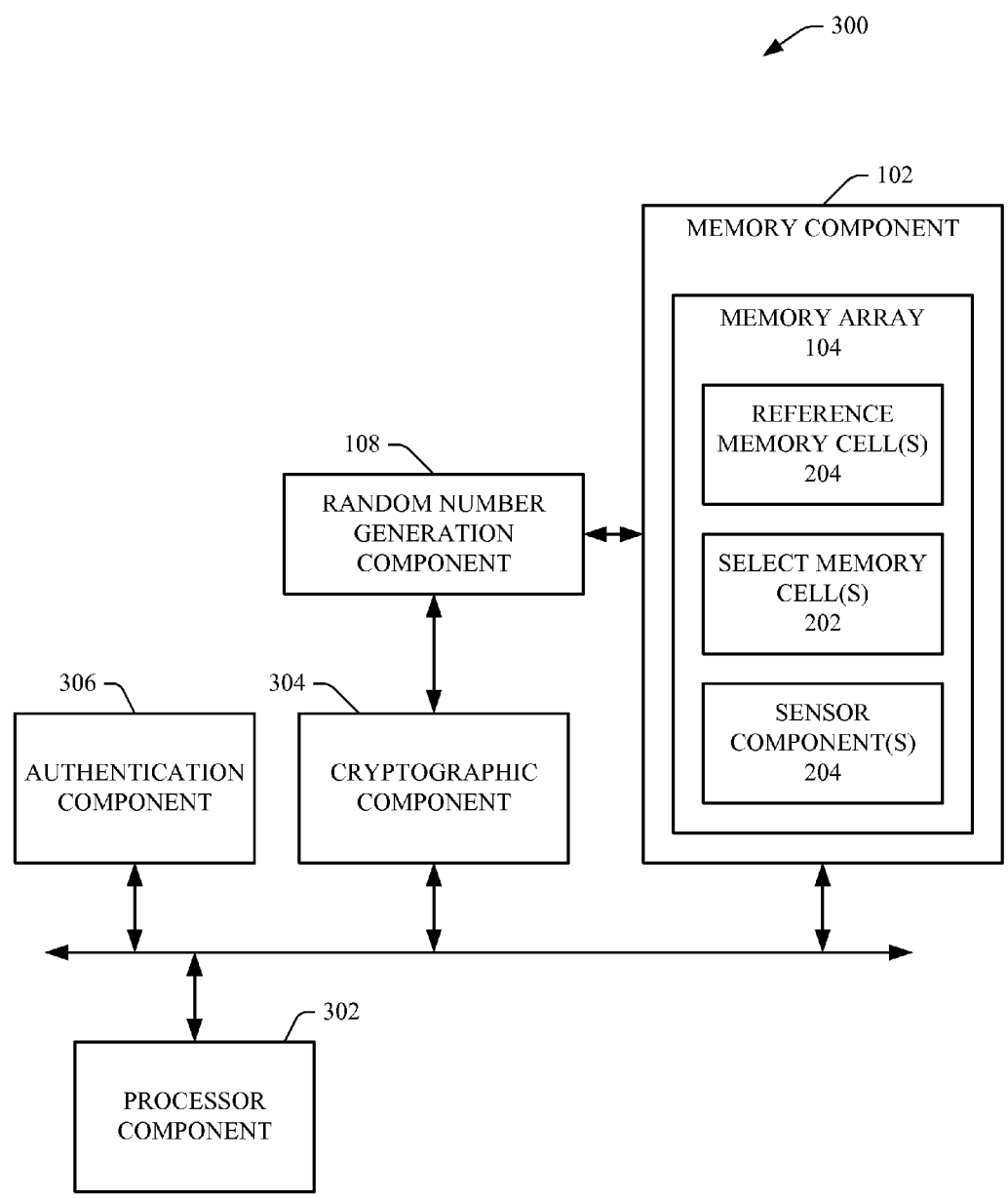
FIG. 3 is a block diagram illustrating a system that can employ random numbers to facilitate security of data in accordance with an aspect of the subject matter disclosed herein.

Turning to FIG. 3, a block diagram of a system 300 that can facilitate security of data in accordance with an aspect of the disclosed subject matter is illustrated. System 300 can include the memory component 102, which can contain a memory array(s) 104, a reference memory cell(s) 106, a select memory cell(s) 202, and sensor component(s) 204. Memory component 102 can be associated with a random number generation component 108 that can facilitate generating random numbers based in part on activity associated with memory cells (e.g. select memory cell(s) 202) of the memory component 102. The memory component 102, memory array 104, reference memory cell(s) 106, random number generation component 108, select memory cell(s) 202, and sensor component(s) 204, each can comprise the respective functionality of respective components, as more fully described herein, for example, with regard to system 100 and/or system 200.

In one aspect, system 300 can include a processor component 302 that can be associated with the memory component 102 and other components via a bus. In accordance with an embodiment of the disclosed subject matter, the processor component 302 can be a typical applications processor that can manage communications and run applications. For example, the processor component 302 can be a processor that can be utilized by a computer, mobile handset, personal data assistant (PDA), or other electronic device. The processor component 302 can generate commands, including read, write, and/or erase commands, in order to facilitate reading data from, writing data to, and/or erasing data from the memory component 102.

The communication of information between the processor component 302, the memory component 102, and other components, can be facilitated via a bus that can be comprised of any of several types of bus structure(s) including, but not limited to, a peripheral bus or external bus, and/or a local bus using any variety of available bus architectures including, but not limited to, Open NAND Flash Interface, Compact Flash Interface, Multimedia Card (MMC), Secure Digital (SD), CE-ATA, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

In another aspect, system 300 can also comprise a cryptographic component 304 that can provide symmetric cryptographic tools and accelerators (e.g., Twofish, Blowfish, AES, TDES, IDEA, CAST5, RC4, etc.) to facilitate securing data. The cryptographic component 304 also can provide asymmetric cryptographic accelerators and tools (e.g., RSA, Digital Signature Standard (DSS), and the like) to facilitate data security. Additionally, cryptographic component 304 can provide accelerators and tools (e.g., Secure Hash Algorithm (SHA) and its variants such as, for example, SHA-0, SHA-1, SHA-224, SHA-256, SHA-384, and SHA-512) to facilitate securing data.

In accordance with an aspect of the disclosed subject matter, the random number generation component 108 can generate random numbers that can be provided to the cryptographic component 304. The cryptographic component 304 can utilize the random numbers to facilitate data encryption and/or decryption, such as by utilizing the random numbers to facilitate generation of a key (e.g., private key), to facilitate generation of a digital signature, and/or to facilitate randomization of the cryptographic process, for example, by using a random number to facilitate randomizing the exponentiation of data during a cryptographic process.

System 300 can also contain an authentication component 306 that can solicit authentication data from an entity, and, upon the authentication data so solicited, can be employed, individually and/or in conjunction with information acquired and ascertained as a result of biometric modalities employed, to facilitate controlling access to the memory component 102. The authentication data can be in the form of a password (e.g. a sequence of humanly cognizable characters), a pass phrase (e.g. a sequence of alphanumeric characters that can be similar to a typical password but is conventionally of greater length and contains non-humanly cognizable characters in addition to humanly cognizable characters), a pass code (e.g., Personal Identification Number (PIN)), a physical signature (e.g. PUF), and the like, for example. Additionally and/or alternatively, public key infrastructure (PKI) data can also be employed by authentication component 306. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g. public keys) and private keys, session keys, Traffic Encryption Keys (TEKs), cryptographic-system-specific keys, and/or other keys, to encrypt and decrypt messages communicated between entities.

The authentication component 306 can implement one or more machine-implemented techniques to identify an entity by its unique physical and behavioral characteristics and attributes. Biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

In accordance with one aspect, the random number generation component 108 can facilitate generating random numbers, and/or raw data having a desired entropy, that can be utilized as a physical signature (e.g. PUF) of the memory component 102 and/or a device (e.g., cellular phone, PDA) associated therewith, where the physical signature can be provided to the memory component 102 and stored in a secure portion of the memory component 102. In another aspect, the physical signature can be utilized to facilitate authentication of the memory component 102 and/or associated device, for example, by providing the physical signature to another electronic device to facilitate authentication.

Figure 4:
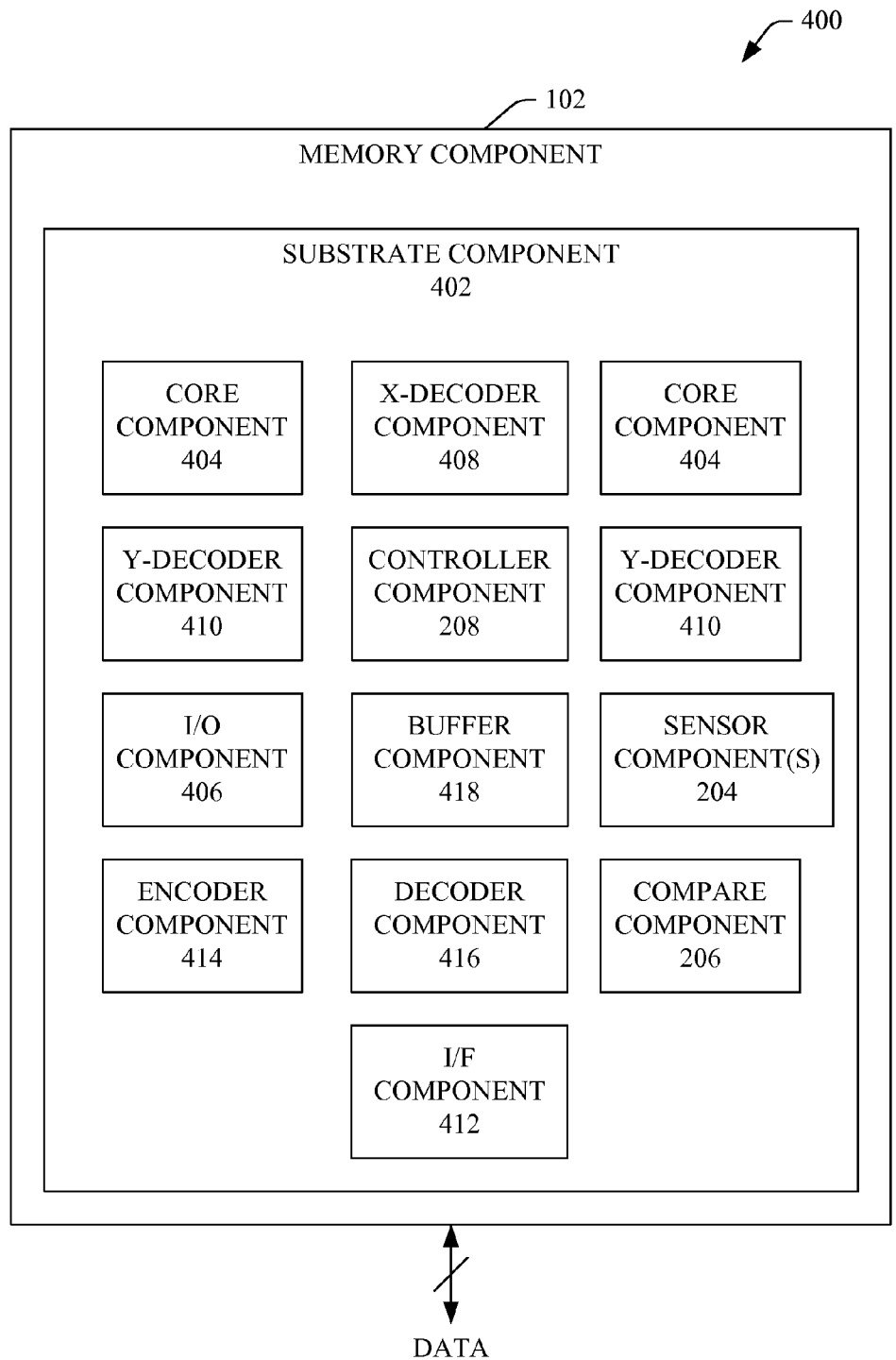
FIG. 4 depicts a block diagram of a system that can facilitate access and/or storage of data in accordance with an aspect of the disclosed subject matter.

Turning to FIG. 4, illustrated is a block diagram of a system 400 that can facilitate access and/or storage of data in a memory in accordance with an aspect of the disclosed subject matter. System 400 can include a memory component 102 that can comprise non-volatile memory (e.g., single-bit flash memory, multi-bit flash memory) and/or volatile memory (e.g., SRAM). The memory component 102 can include a memory array 104 (e.g., as illustrated in FIG. 1 and described herein) that can be comprised of a plurality of memory cells (e.g., as depicted in FIG. 5), which can be memory locations, wherein, for each memory cell, one or more bits of data can be stored, and from which stored data can be read. The memory array 104 can include a plurality of memory cells, including a reference memory cell(s) 106 (e.g., as illustrated in FIGS. 1 and 2, and described herein) and select memory cell(s) 202 (e.g., as illustrated in FIG. 2 and described herein), wherein one or more bits of data can be stored.

The memory component 102 can also contain a sensor component(s) 204 that can be associated with the reference memory cell(s) 106 and/or the select memory cell(s) 202 to facilitate sensing activity associated with a respective memory cell. The memory component 102 can further comprise a compare component 206 that can facilitate comparing information associated with sensed activity of a select memory cell(s) 202 with reference information (e.g., reference voltage level(s)) associated with a reference memory cell(s) 106. The memory component 102 also can contain a controller component 208 that can facilitate controlling the flow of data and/or execution of commands associated with the memory component 102, including the sensing of activity associated with the select memory cell(s) 202.

The memory component 102, memory array 104, reference memory cell(s) 106, select memory cell(s) 202, sensor component(s) 204, compare component 206, and controller component 208, each can be the same or similar as respective components, and/or can contain the same or similar functionality as respective components, as more fully described herein, for example, with regard to system 100, system 200, and/or system 300.

In one aspect, the memory component 102, including the memory array 104, reference memory cell(s) 106, select memory cell(s) 202, sensor component(s) 204, compare component 206, and controller component 208 can be formed and/or contained on a substrate component 402 (e.g., semiconductor substrate). In another aspect, one or more core components 404 (e.g., high-density core regions) and one or more lower-density peripheral regions can be formed on the substrate component 402. The core component(s) 404 typically can include one or more M by N arrays (e.g., memory array 104) of individually addressable, substantially identical multi-bit memory cells (e.g., memory cells as illustrated in FIG. 5 and described herein; the reference memory cell(s) 106, as depicted in FIGS. 1 and 2, and described herein; and select memory cell(s) 202, as illustrated in FIG. 2 and described herein).

The lower-density peripheral regions can typically include an input/output component 406 (e.g., input/output (I/O) circuitry) and programming circuitry for selectively addressing the individual memory cells. The programming circuitry can be represented in part by and can include one or more x-decoder components 408 and one or more y-decoder components 410 that can cooperate with the I/O component 406 for selectively connecting a source (not shown), gate (not shown), and/or drain (not shown) of selected addressed memory cells to predetermined voltages or impedances to effect designated operations (e.g., programming, reading, verifying, erasing) on the respective memory cells, and deriving necessary voltages to effect such operations. For example, an x-decoder component 408 and a y-decoder component 410 can each receive address bus information, which can be provided as part of a command, and such information can be utilized to facilitate determining the desired memory cell(s) in the memory component 102.

The memory component 102 can receive information (e.g., data, commands, etc.) via an interface component 412 (also referred to herein as "I/F 412"), which can also be formed on substrate component 402. I/F 412 can include and/or provide various adapters, connectors, channels, communication paths, etc. to integrate the memory component 102 into virtually any operating and/or database system(s) and/or with one another system(s). In addition, I/F 412 can provide various adapters, connectors, channels, communication paths, etc., that can provide for interaction and/or communication with a processor component 302 (e.g., as depicted in FIG. 3), and/or any other component, data, and the like, associated with the system 400.

The memory component 102 can also contain an encoder component 414 that can facilitate encoding data being programmed to the memory component 102, where the encoder component 414 also can be formed on the substrate component 402. For example, the encoder component 414 can facilitate converting a digital signal to an analog signal (e.g., current level) to facilitate performing operations (e.g., programming) associated with data in the memory locations (e.g., memory cells) in the memory component 102.

The memory component 102 can further include a decoder component 416 that can facilitate decoding data being read from the memory component 102. The decoder component 416 can receive an analog signal associated with data, where the analog signal can be stored in the memory location in the memory array 104, and can facilitate converting the analog signal to a digital signal, so that such digital signal representing the read data can be provided to another component (e.g., processor component 302) for further processing. The memory component 102 can also contain a buffer component 418 that can facilitate storage of data, for example, to temporarily store data, being written to and/or read from the memory array 104.

Turning to FIG. 5, illustrated is an example diagram of a system 500 that can facilitate storage of data in accordance with an aspect of the disclosed subject matter. The system 500 can comprise a memory array 104 that can include a plurality of memory cells 502 that each can be comprised of a drain (D), gate, and source (S). Each memory cell 502 can have one or more levels therein and can store one or more bits of data therein. The memory array 104 can be the same or similar to, and/or can contain the same or similar functionality as, respective components as more fully described herein, for example, with regard to system 100, system 200, system 300, and/or system 400. In one aspect, the system 500 can be employed in the memory component 102 (e.g., which is illustrated in FIG. 4, for instance, and described herein). In accordance with one aspect, a portion of the plurality of memory cells 502 can comprise the reference memory cell(s) 106 (e.g., as illustrate in FIGS. 1 and 2, and described herein) and/or the select memory cell(s) 202 (e.g., as depicted in FIG. 2 and described herein).

The memory array 104 can be associated with an x-decoder component 408 (e.g. WL decoder) and a y-decoder component 410 (e.g., BL decoder) that can each respectively decode inputs/outputs during various operations (e.g., programming, reading, verifying, erasing) that can be performed on the memory cells 502. The x-decoder component 408 and y-decoder component 410 can each receive address bus information and/or other information, and can utilize such information to facilitate accessing or selecting the desired memory cell(s) (e.g., memory location(s)) associated with the command.

The memory cells 502 can be formed in M rows and N columns. A common WL can be attached to the gate of each memory cell 502 in a row, such as word-lines WL0, WL1, WL2, through WLM. A common BL can be attached to each cell 502 in a column, such as bit-lines BL0, BL1, through BLN. A WL can contain, for example, 1024 elements forming multiple words and a sector in the memory array 104 can include, for example, 512 WLs to provide at least 512 k elements of memory. In accordance with an aspect of the disclosed subject matter, respective voltages can be applied to one or more cells 502 through the WLs and BLs to facilitate performing operations, such as program, read, erase, and the like.

Figure 6:
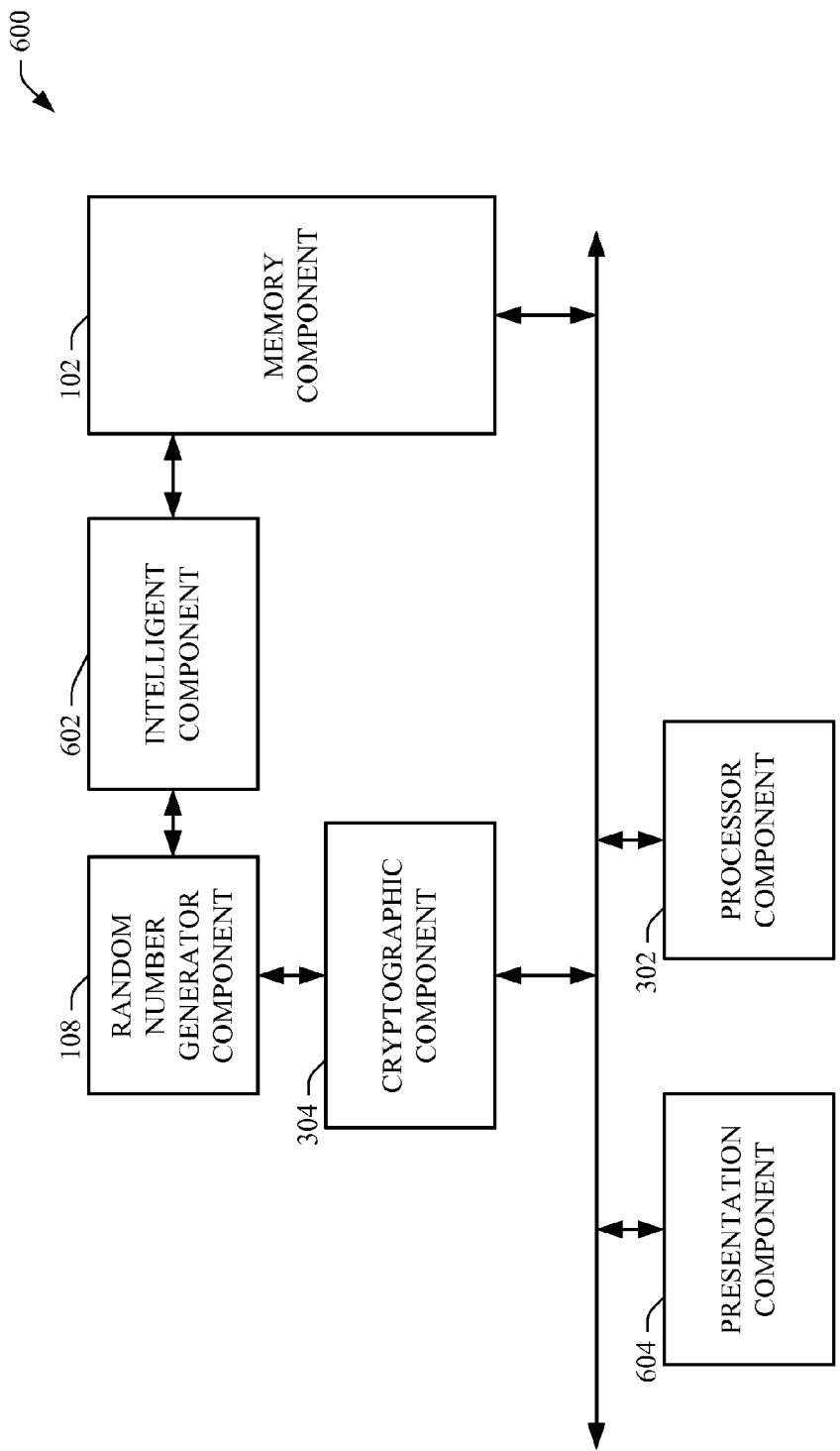
FIG. 6 illustrates a methodology that can employ intelligence to facilitate random number generation to facilitate security of data in accordance with an aspect of the disclosed subject matter.

Referring to FIG. 6, depicted is a system 600 that can employ intelligence to facilitate securing data and/or generating digital signatures in accordance with the disclosed subject matter. System 600 can include a memory component 102, random number generation component 108, a processor component 302, and a cryptographic component 304 that each can be the same or substantially similar, and/or can have the same or similar functionality, as respective components as described herein, for example, with regard to system 100, system 200, system 300, system 400, and/or system 500.

The system 600 can further include an intelligent component 602. The intelligent component 602 can be associated with the random number generation component 108 and/or memory component 102 to facilitate analyzing data and can make an inference and/or a determination regarding, for example, a data value (e.g., binary data value) associated with sensed activity of a memory cell (e.g. select memory cell 202, as illustrated in FIG. 2 and described herein) in the memory component 102, a level of entropy associated with the sensed activity, whether a desired level of entropy exists with regard to information associated with sensed activity, a result of a comparison of information associated with a sensed activity with reference information, etc.

For example, the intelligent component 602 can analyze current and/or historical evidence regarding sensed activity of a select memory cell(s) 202, and, based in part on such evidence, can infer whether a particular portion of the sensed activity has a particular data value (e.g., binary value of 0 or 1). As further example, based in part on current and/or historical evidence, the intelligent component 602 can infer whether a set of information associated with the sensed activity, or a subset thereof, contains a predetermined amount of entropy to facilitate random number generation.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 600 also can include a presentation component 604, which can be associated with the processor component 302. The presentation component 604 that provides various types of user interfaces to facilitate interaction between a user and any component coupled to the processor component 302. As depicted, the presentation component 604 is a separate entity that can be utilized with the processor component 302 and associated components. However, it is to be appreciated that the presentation component 604 and/or similar view components can be incorporated into the processor component 302 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the processor component 302.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

In accordance with one embodiment of the disclosed subject matter, the memory component 102, and/or other components (e.g., cryptographic component 304, authentication component 306, etc.) can be situated or implemented on a single integrated-circuit chip. In accordance with another embodiment, the memory component 102 and/or other components can be implemented on an application-specific integrated-circuit (ASIC) chip.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 7-11 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 7:
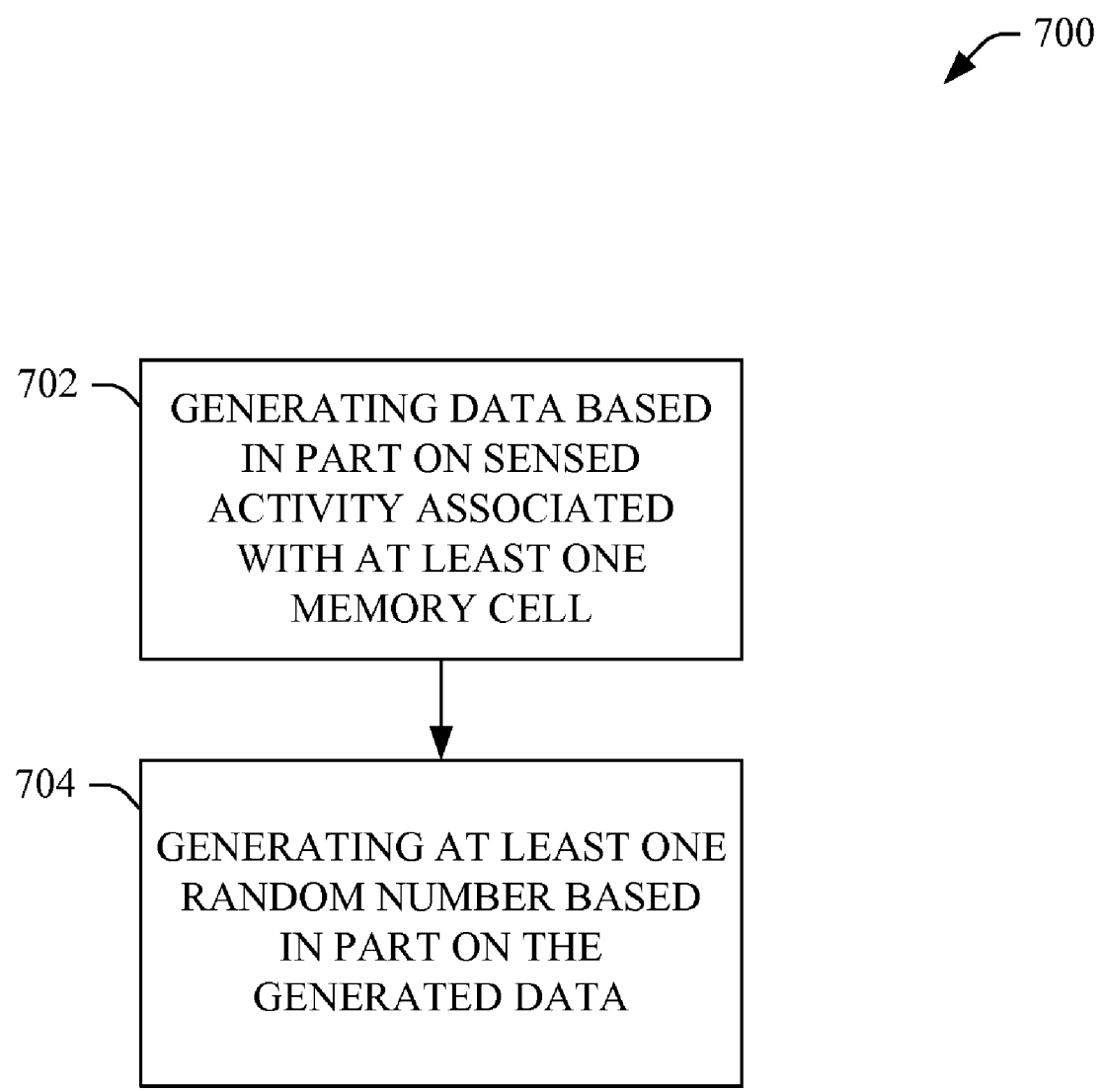
FIG. 7 depicts a methodology for generating random numbers to facilitate data security in accordance with an aspect of the disclosed subject matter.

Referring to FIG. 7, illustrated is a methodology 700 that can facilitate generating random numbers to facilitate security of data in accordance with an aspect of the disclosed subject matter. At 702, data can be generated based in part on sensed activity associated with at least one memory cell (e.g., select memory cell 202) of a memory component (e.g., 102). In one aspect, activity, such as electron activity associated with a specified memory cell(s) (e.g. select memory cell(s) 202) can be sensed and/or detected, and/or converted to a corresponding voltage level, and can be compared with a reference voltage potential associated with a reference memory cell (e.g., 106) to facilitate determining a data value (e.g. binary data value) associated with the sensed activity. Data (e.g., sequence(s) of binary data) can be generated based in part on respective portions of the sensed activity.

At 704, at least one random number can be generated based in part on the generated data. In one aspect, the generated data associated with the sensed activity can be received by a random number generation component (e.g., 108) that can evaluate the generated data to determine whether a predetermined amount of entropy exists such that the generated data can be utilized as a seed to facilitate generating random numbers. In another aspect, the amount of entropy of a given piece of generated data can be measured based in part on testing the data to determine, for example, whether the generated data has a desired level of randomness, such that desired random numbers can be derived therefrom. In still another aspect, the generated data, or a portion thereof, having the predetermined amount of entropy, can be processed (e.g., compressed) and utilized to facilitate generating one or more random numbers. At this point, methodology 700 can end.

Figure 8:
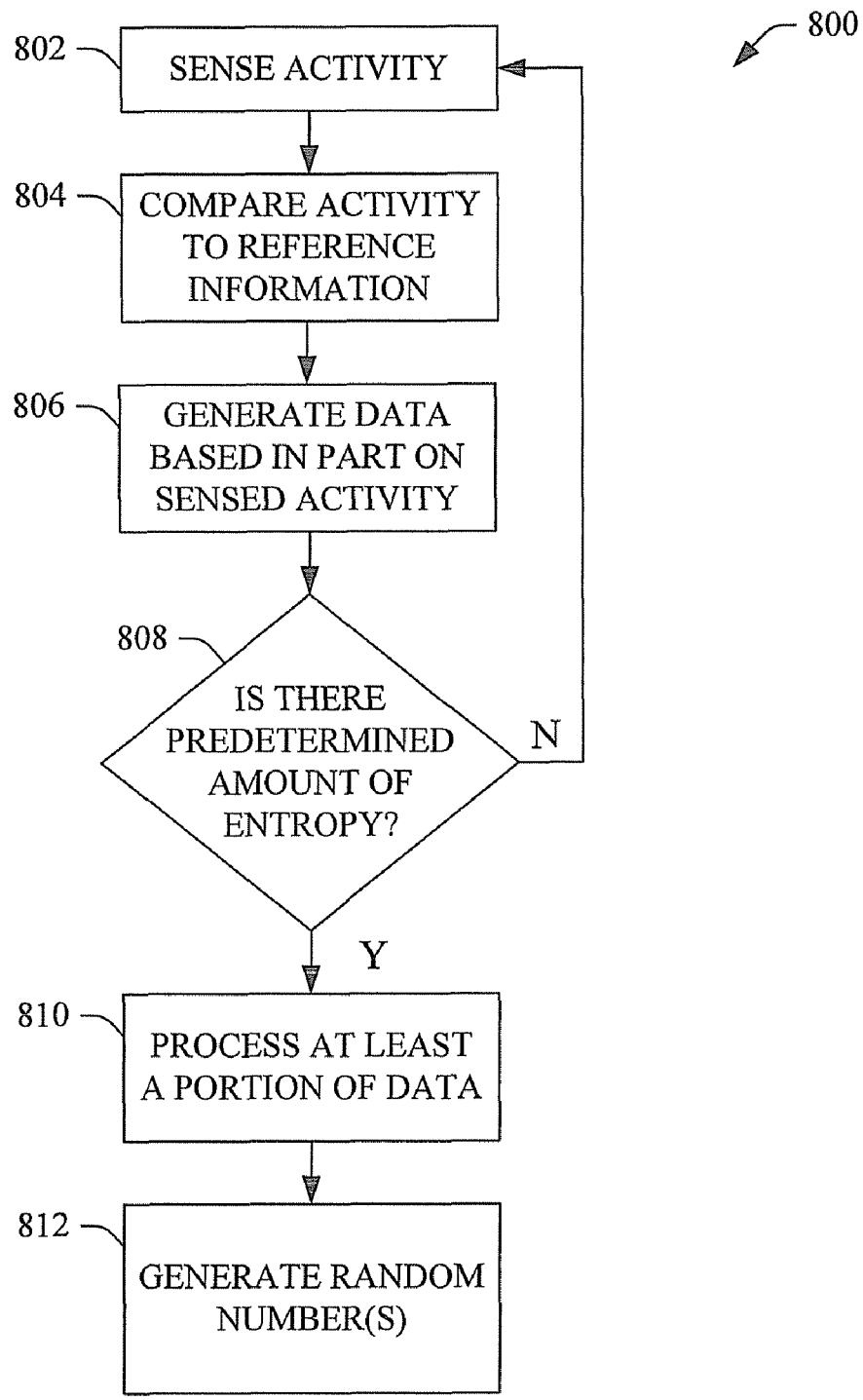
FIG. 8 illustrates another methodology for generating random numbers to facilitate securing data in accordance with an aspect of the subject matter disclosed herein.

FIG. 8 depicts a methodology 800 that can generate random numbers to facilitate securing data in accordance with an aspect of the disclosed subject matter. At 802, activity associated with a memory cell(s) (e.g., select memory cell(s) 202, as illustrated in FIG. 2 and described herein) can be sensed and/or detected. In one aspect, a sensor component (e.g., 204) can sense electron activity associated with the memory cell(s) and can convert the sensed electron activity to a corresponding voltage level. At 804, the sensed activity can be compared to reference information to facilitate determining a data value associated with the sensed activity. In one aspect, each piece of the sensed activity, as represented by its corresponding voltage level, can be compared to a reference voltage level(s) to facilitate determining whether the sensed activity falls within a predetermined threshold voltage level region associated with a noise margin of memory cells in the memory component (e.g. 102).

At 806, data can be generated based in part on the sensed activity. In accordance with an aspect, a compare component (e.g., 206) can generate data, such as binary data, for example, based in part on comparing the sensed activity, as represented by corresponding voltage levels, to the reference voltage level and/or predetermined threshold voltage level region. The generated data can be in the form of one or more binary sequences, for example.

At 808, a determination can be made regarding whether the generated data contains a predetermined amount of entropy. In one aspect, an evaluation component (e.g., 212) can evaluate the data, such as by performing pre-testing of the data, to determine whether the predetermined amount of entropy exists with respect to the data, or a portion thereof. The predetermined amount of entropy can be as desired, and can be an amount such that there can be a desired randomness in numbers generated based on the data, or portion thereof, once processed (e.g., compressed). If it is determined that the data does not contain the predetermined amount of entropy, methodology 800 can return to reference numeral 802, wherein activity associated with a memory cell can be sensed, and methodology 800 can proceed from that point. If, at 808, it is determined that the data, or a portion thereof, contains the predetermined amount of entropy, at 810, the data, or a portion thereof, can be processed. In one aspect, the data can be processed to compress and/or harvest information that can be utilized to facilitate generating random numbers.

At 812, one or more random numbers can be generated based in part on the sensed activity. In accordance with an aspect, a generation component (e.g., 214) can generate the random number(s) by processing the data, or a portion thereof, having the predetermined amount of entropy. The data can be based in part on the sensed activity associated with a memory cell(s) in the memory component. At this point, methodology 800 can end.

Figure 9:
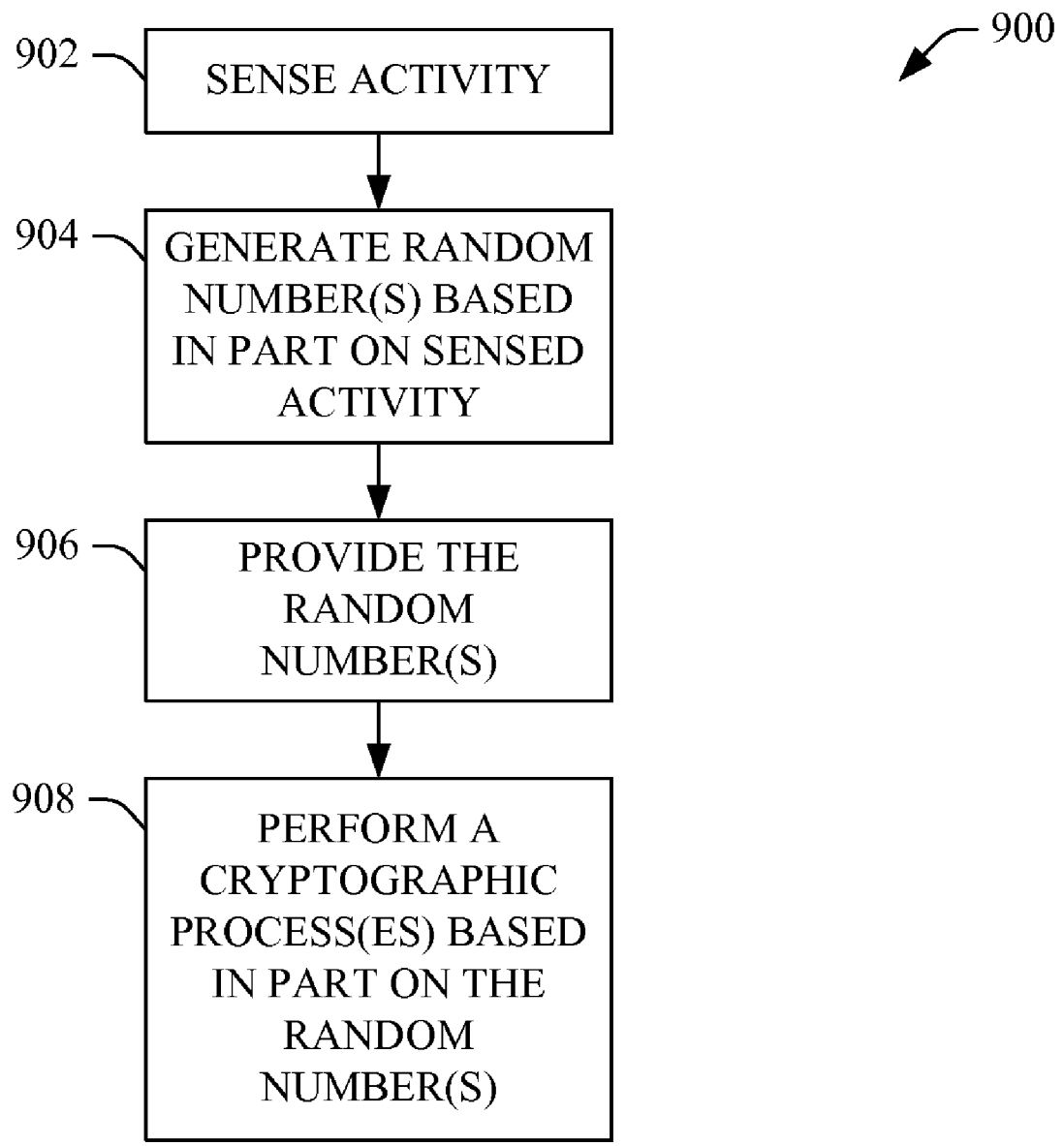
FIG. 9 illustrates a methodology that generates random numbers to facilitate performing a cryptographic process(es) on data to facilitate securing the data in accordance with an aspect of the disclosed subject matter.

Turning to FIG. 9, depicted is a methodology 900 that can facilitate generating random numbers to facilitate securing data utilizing cryptography in accordance with an aspect of the disclosed subject matter. At 902, activity associated with a memory cell(s) (e.g., select memory cell(s) 202, as illustrated in FIG. 2 and described herein) can be sensed and/or detected. In one aspect, a sensor component (e.g., 204) can sense electron activity associated with the memory cell(s) and can convert the sensed electron activity to a corresponding voltage level. At 904, one or more random numbers can be generated based in part on the sensed activity. For example, data, such as binary data, can be generated based in part on the activity sensed from the memory cell(s). The data can be pre-tested to determine whether such data, or a portion thereof, contains a desired amount of entropy so that the data can be suitable for use in generating random numbers. The data, or a portion thereof, that contains the desired amount of entropy can be processed, for example, through compressing and/or harvesting such data, to facilitate generating the one or more random numbers.

At 906, the one or more random numbers can be provided as an output. In accordance with one aspect, the random number generation component can provide the one or more random numbers to a cryptographic component (e.g., 304). At 908, one or more cryptographic processes can be performed based in part on the random number(s). In one aspect, the cryptographic component can receive a random number(s) and can utilize the random number(s) to facilitate encryption and/or decryption of data. For example, a random number can be utilized to generate a private key that can be utilized to encrypt and/or decrypt data, and/or generate a digital signature, associated with an electronic document. As another example, a random number can be utilized to facilitate randomizing the exponentiation of data being decrypted to facilitate data security. At this point, methodology 900 can end.

Figure 10:
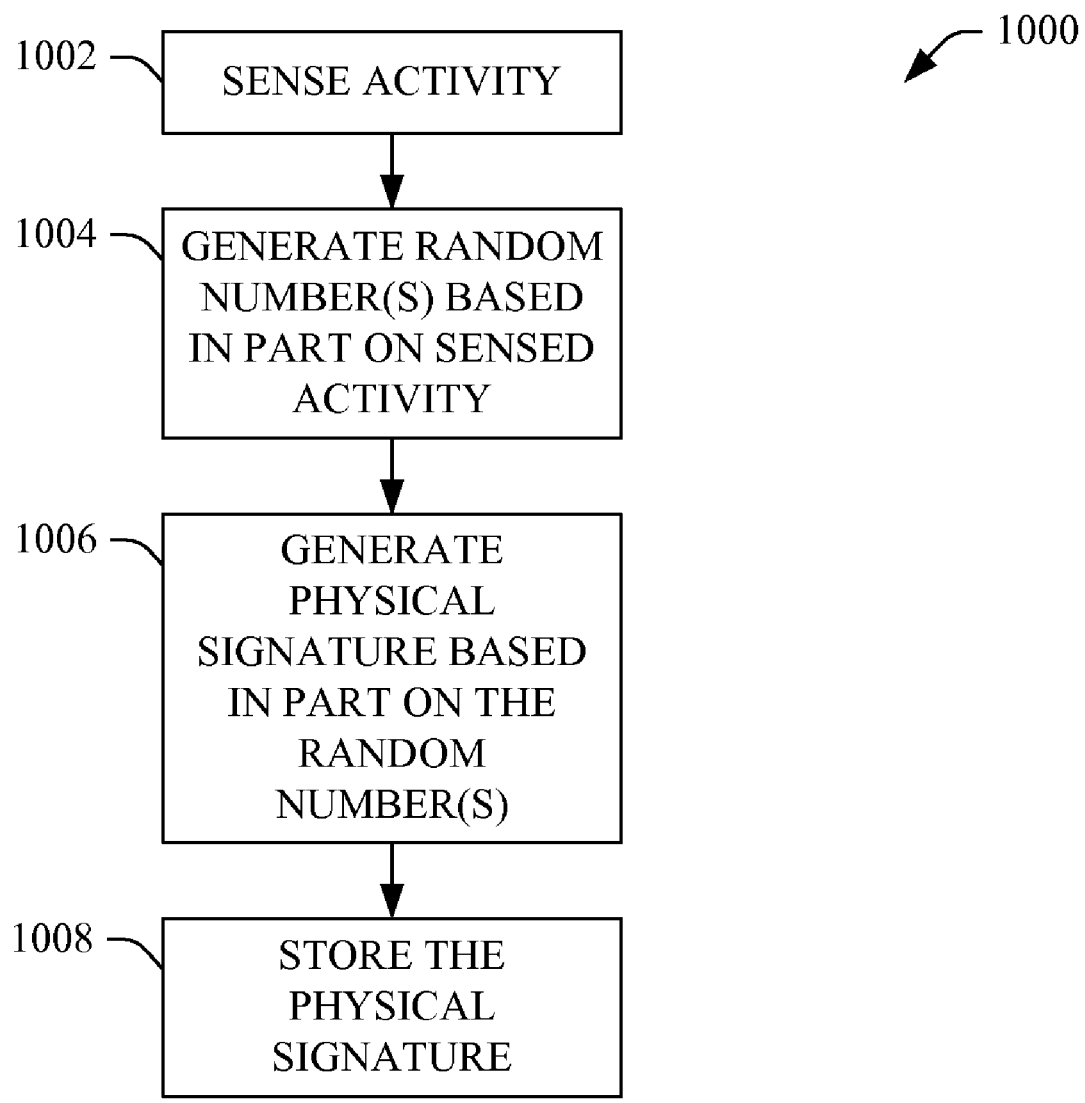
FIG. 10 depicts a methodology that generates random numbers to facilitate generating a physical signature to facilitate identification and/or authentication in accordance with an aspect of the disclosed subject matter.

Referring to FIG. 10, illustrated is a methodology 1000 that can employ a random number to facilitate generating a physical signature associated with a memory component and/or associated device in accordance with an aspect of the disclosed subject matter. At 1002, activity (e.g., electron activity) associated with a memory cell(s) (e.g., select memory cell(s) 202, as depicted in FIG. 2 and described herein) can be sensed and/or detected. In one aspect, a sensor component (e.g., 204) can sense electron activity associated with the memory cell(s) and can convert the sensed electron activity to a corresponding voltage level. At 1004, one or more random numbers can be generated based in part on the sensed activity. For example, data (e.g., binary data) can be generated based in part on the electron activity sensed from the memory cell (s). The data can be pre-tested to determine whether such data, or a portion thereof, contains a desired amount of entropy (e.g., information entropy) so that the data can be suitable for use in generating random numbers. The data, or a portion thereof, that contains the desired amount of entropy can be processed, for example, through compressing and/or harvesting such data, to facilitate generating the one or more random numbers.

At 1006, a physical signature associated with the memory component (e.g., 102) and/or a device (e.g., cellular phone, PDA) associated therewith, can be generated based in part on the random number(s). In accordance with one aspect, the random number(s), which can be based in part on a sequence of binary data that can be based in part on the sensed activity of the memory cell(s), and/or other information associated with the memory component, can be utilized to form a unique physical signature, such as a PUF, that can be utilized to facilitate identifying and/or authenticating the memory component and/or a device associated therewith. In another aspect, such other information can be information stored in a secure region of the memory component, where such information can be stored as part of a one-time programming. At this point, methodology 1000 can end.

Figure 11:
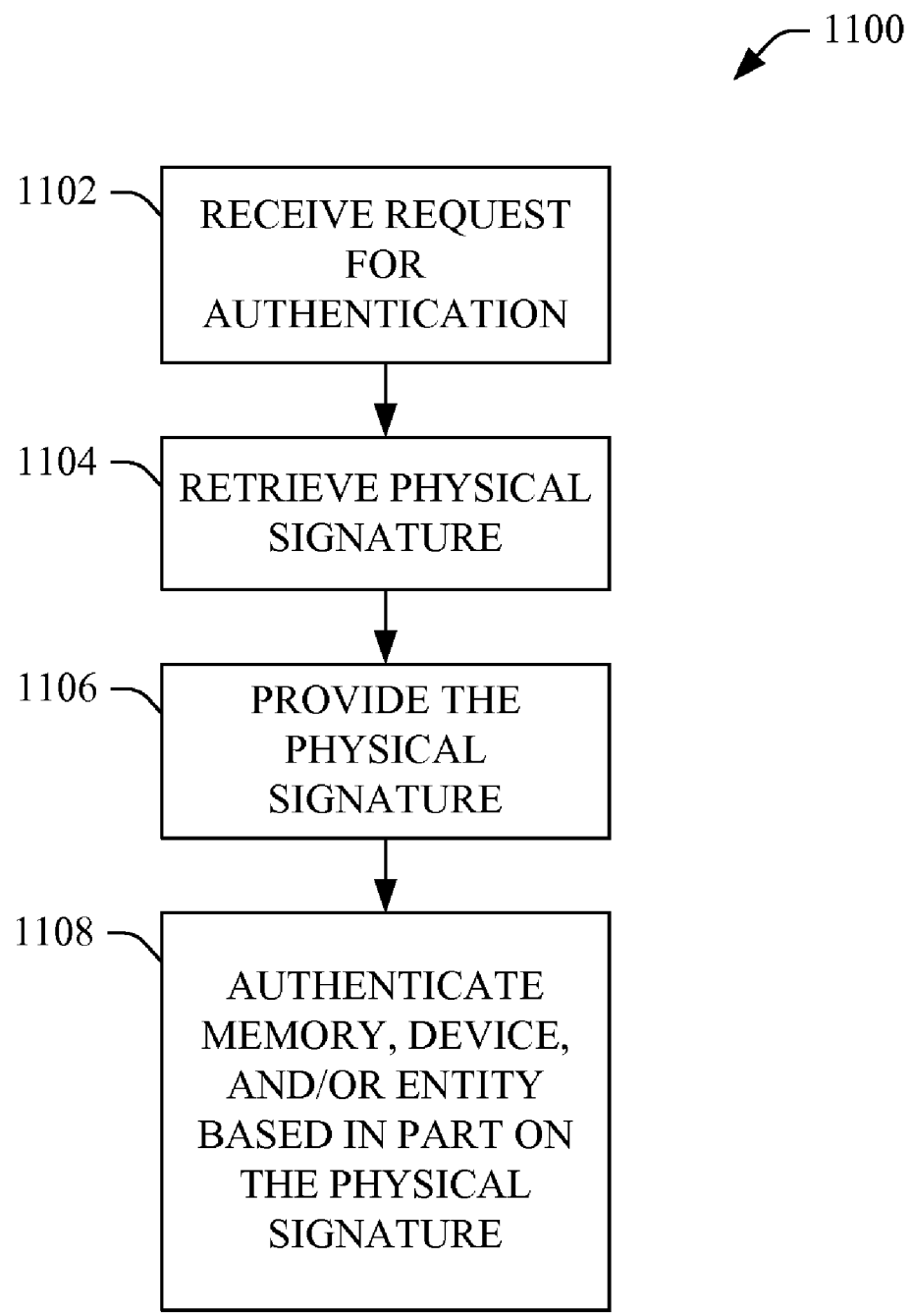
FIG. 11 illustrates a methodology that employs random numbers to facilitate authenticating a device in accordance with an aspect of the disclosed subject matter.

Turning to FIG. 11, illustrated is a methodology 1100 that employs a physical signature to facilitate authentication of a memory component and/or device associated therewith in accordance with an aspect of the disclosed subject matter. At 1102, a request for authentication can be received. In one aspect, a request for authentication can be received, for example, by a device associated with the memory component (e.g., 102). At 1104, a physical signature associated with the memory component and/or device associated therewith can be retrieved. For example, the physical signature can be retrieved from a secure portion in the memory component, wherein the memory component can control the access to such secure portion of the memory component and/or the physical signature stored therein. At 1106, the physical signature and/or other authentication-related information can be provided. At 1108, the memory component and/or associated device can be authenticated based in part on the physical signature and/or the other authentication-related information. At this point, methodology 1100 can end.

Figure 12:
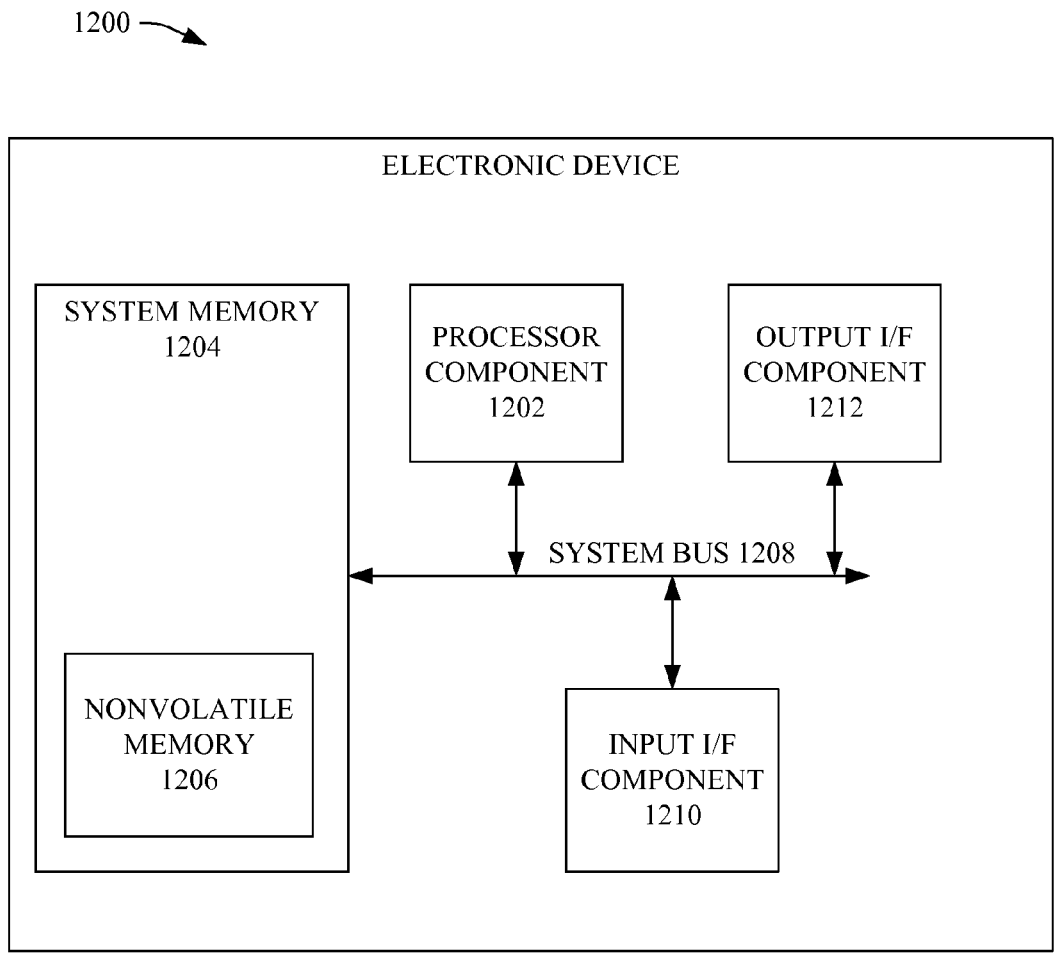
FIG. 12 illustrates an example of an electronic device that can be associated with a memory in accordance with an aspect of the disclosed subject matter.

Referring to FIG. 12, illustrated is a block diagram of an exemplary, non-limiting electronic device 1200 that can comprise and/or incorporate system 100, system 200, system 300, system 400, system 500, and/or system 600, or a respective portion(s) thereof. The electronic device 1200 can include, but is not limited to, a computer, a laptop computer, network equipment (e.g. routers, access points), a media player and/or recorder (e.g., audio player and/or recorder, video player and/or recorder), a television, a smart card, a phone, a cellular phone, a smart phone, an electronic organizer, a PDA, a portable email reader, a digital camera, an electronic game (e.g., video game), an electronic device associated with digital rights management, a Personal Computer Memory Card International Association (PCMCIA) card, a trusted platform module (TPM), a Hardware Security Module (HSM), a set-top box, a digital video recorder, a gaming console, a navigation system or device (e.g., global position satellite (GPS) system), a secure memory device with computational capabilities, a device with a tamper-resistant chip(s), an electronic device associated with an industrial control system, an embedded computer in a machine (e.g., an airplane, a copier, a motor vehicle, a microwave oven), and the like.

Components of the electronic device 1200 can include, but are not limited to, a processor component 1202 (e.g. which can be and/or can include the same or similar functionality as processor component 302, as depicted in FIG. 3 and described herein), a system memory 1204, which can contain a nonvolatile memory 1206, and a system bus 1208 that can couple various system components including the system memory 1204 to the processor component 1202. The system bus 1208 can be any of several types of bus structures including a memory bus or memory controller, a peripheral bus, or a local bus using any of a variety of bus architectures.

Electronic device 1200 can typically include a variety of computer readable media. Computer readable media can be any available media that can be accessed by the electronic device 1200. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, nonvolatile memory 1206 (e.g., flash memory), or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 1200. Communication media typically embodies computer readable instructions, data structures, program modules or other data in a modulated data signal such as a carrier wave or other transport mechanism and includes any information delivery media.

The system memory 1204 can include computer storage media in the form of volatile (e.g., SRAM) and/or nonvolatile memory 1206 (e.g., flash memory). For example, nonvolatile memory 1206 can comprise one or more memory components that can be the same or similar, or can contain the same or similar functionality, as memory component 102 (e.g., as described with regard to system 100, system 200, system 300, system 400, etc.). A basic input/output system (BIOS), containing the basic routines that can facilitate transferring information between elements within electronic device 1200, such as during start-up, can be stored in the system memory 1204. The system memory 1204 typically also can contain data and/or program modules that can be accessible to and/or presently be operated on by the processor component 1202. By way of example, and not limitation, the system memory 1204 can also include an operating system(s), application programs, other program modules, and program data.

The nonvolatile memory 1206 can be removable or non-removable. For example, the nonvolatile memory 1206 can be in the form of a removable memory card or a USB flash drive. In accordance with one aspect, the nonvolatile memory 1206 can include flash memory (e.g. single-bit flash memory, multi-bit flash memory), ROM, PROM, EPROM, EEPROM, or NVRAM (e.g., FeRAM), or a combination thereof, for example. Further, a flash memory can comprise NOR flash memory and/or NAND flash memory.

In one aspect, the nonvolatile memory 1206 can be associated with a random number generation component 108 (e.g., not shown in FIG. 12; as illustrated in FIGS. 1, 2, 3, and/or 6, and described herein) where the random number generation component 108 can generate random numbers based in part on sensed activity in memory cells of the nonvolatile memory 1206 to facilitate securing data. For example, the random numbers generated by the random number generation component 108 can be employed in cryptographic processes and/or authentication processes to secure data associated with the nonvolatile memory 1206.

A user can enter commands and information into the electronic device 1200 through input devices (not shown) such as a keypad, microphone, tablet, or touch screen although other input devices can also be utilized. These and other input devices can be connected to the processor component 1202 through input interface component 1210 that can be connected to the system bus 1208. Other interface and bus structures, such as a parallel port, game port or a universal serial bus (USB) can also be utilized. A graphics subsystem (not shown) can also be connected to the system bus 1208. A display device (not shown) can be also connected to the system bus 1208 via an interface, such as output interface component 1212, which can in turn communicate with video memory. In addition to a display, the electronic device 1200 can also include other peripheral output devices such as speakers (not shown), which can be connected through output interface component 1212.

It is to be understood and appreciated that the computer-implemented programs and software can be implemented within a standard computer architecture. While some aspects of the disclosure have been described above in the general context of computer-executable instructions that can be run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone), microprocessor-based or programmable consumer electronics, and the like, each of which can be operatively coupled to one or more associated devices.

The illustrated aspects of the disclosure may also be practiced in distributed computing environments where certain tasks are performed by remote processing devices that are linked through a communications network. In a distributed computing environment, program modules can be located in both local and remote memory storage devices.

As utilized herein, terms "component," "system," "interface," and the like, can refer to a computer-related entity, either hardware, software (e.g. in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
a memory that includes of a plurality of flash memory cells configured to contain at least one select memory cell, wherein electron activity of the at least one select memory cell is sensed and binary data is generated based in part on the electron activity sensed in the at least one select memory cell, the electron activity generated by an electric field due to voltages applied in any of a source, drain, and gate, the electron activity based at least in part on at least one of: electrons becoming trapped in a floating gate, or electrons being removed from the floating gate of the plurality of flash memory cells; and
a hardware processor configured to evaluate the binary data to determine whether a predetermined amount of entropy exists in at least a portion of the binary data, process the at least a portion of the binary data that contains the predetermined amount of entropy to generate at least one random number and organize the binary data in order to facilitate the generation of at least one random number.

2. The system of claim 1, the memory further comprises at least one reference memory cell, the sensed activity of the at least one select memory cell is converted to a corresponding voltage level and the corresponding voltage level is compared to a reference voltage level associated with the at least one reference memory cell to facilitate generation of binary data that is based in part on the sensed activity.

3. The system of claim 2, the memory further comprises one or more sensors that sense activity in the at least one select memory cell or the at least one reference memory cell, or a combination thereof, the one or more sensors sense activity associated with a noise margin associated with the at least one select memory cell or the at least one reference memory cell, or a combination thereof.

4. The system of claim 1, the hardware processor further receives the at least one random number and utilizes the at least one random number to perform a cryptographic process associated with the data.

5. The system of claim 1, the at least one random number is utilized as at least a portion of a physical signature that is associated with the memory, the physical signature is stored in a secure memory location in the memory and can be provided as an output to facilitate authentication of the memory, or a device or an entity associated therewith.

6. The system of claim 1, the hardware processor further infers at least one of a data value of the binary data associated with the activity of the at least one select memory cell, an amount of entropy associated with the binary data, or whether the amount of entropy associated with the binary data meets a predetermined threshold amount of entropy, or a combination thereof.

7. The system of claim 1, the hardware processor further stores at least one of the at least one random number, information that facilitates evaluation of the binary data, or information that facilitates generation of the at least one random number, or a combination thereof.

8. An electronic device comprising the system of claim 1.

9. The electronic device of claim 8, wherein the electronic device is one of a computer, a cellular phone, a digital phone, a video device, a smart card, a personal digital assistant, a television, an electronic game, a digital camera, an electronic organizer, an audio player, an audio recorder, an electronic device associated with digital rights management, a Personal Computer Memory Card International Association (PCM-CIA) card, a trusted platform module (TPM), an electronic control unit associated with a motor vehicle, a global positioning satellite (GPS) device, an electronic device associated with an airplane, an electronic device associated with an industrial control system, a Hardware Security Module (HSM), a set-top box, a secure memory device with computational capabilities, or an electronic device with at least one tamper-resistant chip.

10. A method, comprising:
generating binary data, by a hardware processor, based in part on sensed electron activity associated with at least one flash memory cell, the electron activity generated by an electric field due to voltages applied in any of a source, drain, and gate, wherein generating data based in part on sensed electron activity associated with the at least one flash memory cell, includes sensing electron activity in the at least one flash memory cell based at least in part on at least one of electrons becoming trapped in a floating gate, or electrons being removed from the floating gate of the at least one flash memory cell;
evaluating, by the hardware processor, the generated binary data to determine that at least a subset of the generated binary data contains a predetermined level of information entropy;
processing, by the hardware processor, the at least a subset of the generated binary data that contains the predetermined level of information entropy;
generating, by the hardware processor, at least one random number based in part on the at least a subset of the generated binary data that contains the predetermined level of information entropy; and
organizing, by the hardware processor, the binary data in order to facilitate the generating of at least one random number.

11. The method of claim 10, further comprising:
sensing activity associated with the at least one memory cell;
converting the sensed activity to a corresponding voltage level; and
comparing the corresponding voltage level to a reference voltage level to facilitate generating data based in part on the sensed activity.

12. The method of claim 10, the evaluating the generated data further comprising testing the generated data based in part on a protocol that facilitates determining randomness of data.

13. The method of claim 10, the processing the at least a subset of the generated data that contains the predetermined level of information entropy further comprising:
compressing the at least a subset of the generated data; and
generating the at least one random number based in part on the compression of the at least a subset of the generated data.

14. The method of claim 10, further comprising:
providing the at least one random number; and
performing a cryptographic process based in part on the at least one random number.

15. The method of claim 10, further comprising:
generating a physical signature based in part on the at least one random number; and
storing the physical signature.

16. The method of claim 15, further comprising:
receiving a request for authentication;
retrieving the physical signature;
providing the physical signature; and
authenticating at least one of a memory component, an electronic device, or an entity, or a combination thereof, associated with the physical signature based in part on the physical signature.

17. The system of claim 1, the hardware processor further configured to store the at least one random number generated.

* * * * *